(12) United States Patent
Aviles

(10) Patent No.: US 7,581,539 B2
(45) Date of Patent: *Sep. 1, 2009

(54) BAFFLE-TYPE GREASE FILTERS FOR KITCHEN VENTILATORS

(75) Inventor: Josue V. Aviles, Jenkintown, PA (US)

(73) Assignee: Franklin Machine Products, Lamberton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/023,178

(22) Filed: Jan. 31, 2008

(65) Prior Publication Data

US 2009/0194093 A1    Aug. 6, 2009

(51) Int. Cl.
F24C 15/20 (2006.01)

(52) U.S. Cl. .............. 126/299 D; 126/299 R; 55/DIG. 36; 55/444; 55/443

(58) Field of Classification Search ............. 126/299 R, 126/299 E, 299 D; 55/DIG. 36, 444, 471, 55/443, 462; 454/67, 49; 431/289, 296, 431/253, 343
See application file for complete search history.

(56) References Cited

U.S. PATENT DOCUMENTS

| | | | |
|---|---|---|---|
| 3,364,664 A | 1/1968 | Doane | |
| 3,376,804 A | 4/1968 | Marks | |
| 3,566,585 A | 3/1971 | Voloshen et al. | |
| 3,813,856 A | 6/1974 | Jensen | |
| 3,834,135 A | 9/1974 | Jordan | |
| 3,870,494 A | 3/1975 | Doane | |
| 3,910,782 A | 10/1975 | Struble et al. | |
| 3,945,812 A | 3/1976 | Doane | |
| 3,955,949 A | 5/1976 | Rohrer | |
| 4,189,990 A | 2/1980 | Kittler | |
| 4,319,898 A | 3/1982 | Maierhofer | |
| 4,690,701 A | 9/1987 | Hedrick et al. | |
| 5,302,174 A | 4/1994 | Guetersloh | |
| 5,320,656 A | 6/1994 | Hammer | |
| 5,342,422 A | 8/1994 | Wimbock | |
| 6,041,774 A * | 3/2000 | Ward et al. .............. 126/299 D |
| 6,454,825 B1 | 9/2002 | Cheimets et al. | |
| 6,543,526 B2 * | 4/2003 | Jacobs ........................ 165/144 |
| 6,656,244 B1 * | 12/2003 | Galassi ........................ 55/444 |
| 6,840,975 B2 | 1/2005 | Bohacik | |
| 6,878,175 B2 * | 4/2005 | Keller et al. .................. 55/320 |
| 7,150,774 B2 | 12/2006 | Kubokawa et al. | |
| 2007/0056578 A1 | 3/2007 | Aviles | |
| 2008/0202083 A1 | 8/2008 | Graham et al. | |

OTHER PUBLICATIONS

Quest Metal Products Limited, "Fireguard Filter", 2-page brochure, Feb. 1977.
Office Action dated Feb. 5, 2009 issued in Commonly-Owned, Co-Pending U.S. Pat. No. 11/226,140.

* cited by examiner

Primary Examiner—Kenneth B Rinehart
Assistant Examiner—Daniel A Bernstein
(74) Attorney, Agent, or Firm—Howson & Howson LLP

(57) ABSTRACT

A grease filter has upper and lower baffle assemblies that define tortuous paths for exhaust air flowing therethrough. The baffles in the upper assembly include a perforated metal strips and bent free edges to maximize grease extraction from the exhaust air. A hinge connects the upper and lower baffle assemblies and permits the assemblies to pivot from a closed position to an open position. In the open position, access is provided to all surfaces of the assemblies so that they can be efficiently cleaned.

18 Claims, 4 Drawing Sheets

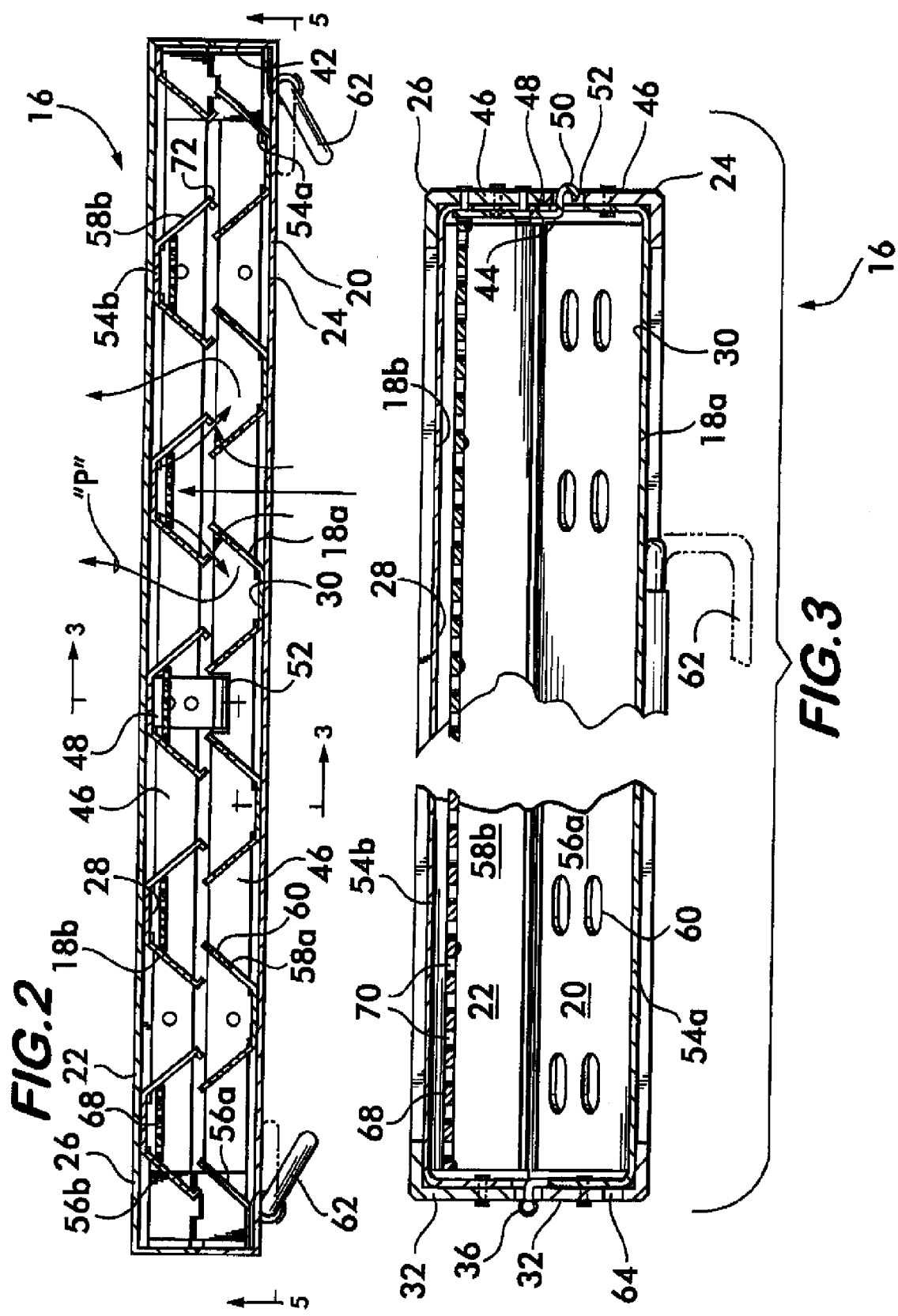

US 7,581,539 B2

BAFFLE-TYPE GREASE FILTERS FOR KITCHEN VENTILATORS

BACKGROUND OF THE INVENTION

The present invention relates to grease filters of the type employed in canopies or hoods over relatively large grills, broilers, ranges, stoves and like equipment in kitchens of restaurants, institutions and other facilities where food is prepared.

Grease filters are typically provided with a rectangular frame to which rows of baffles are secured in staggered relation to form a grease and/or flame retarding filter for a kitchen exhaust/ventilation system. An example is the grease filter disclosed by U.S. Patent Application Publication No. 2007/0056578 A1 of Aviles assigned to Franklin Machine Products, the assignee of the present application.

Other examples of such filters are disclosed in U.S. Pat. Nos. 3,566,585 issued to Voloshen et al.; 3,813,856 issued to Jensen; 3,834,135 issued to Jordan; 3,870,494 and 3,945,812 issued to Doane; 3,910,782 issued to Struble et al.; and 3,955,949 issued to Rohrer. Also see U.S. Pat. Nos. 4,690,701 issued to Hedrick et al.; 4,319,898 issued to Maierhofer; 3,364,664 issued to Doane; 3,376,804 issued to Marks; 4,189,990 issued to Kittler; 5,302,174 issued to Guetersloh; 5,320,656 issued to Hammer; 5,342,422 issued to Wimbock; 6,454,825 B1 issued to Cheimets et al.; 6,656,244 B1 issued to Galassi; and 6,840,975 B2 issued to Bohacik that disclose other baffled filter structures.

While the grease filters disclosed in the above referenced patents may function in a satisfactory manner for their intended purposes, there remains a need for grease filters that maximize grease extraction from grease laden air. Preferably, the grease filter should be re-useable and should be capable of being positioned in a closed condition for extracting grease from grease-laden exhaust air and an open position for permitting direct cleaning of all filter surfaces. In addition, the grease filter should preferably include a locking mechanism capable of preventing undesired opening of the filter during use.

SUMMARY OF THE INVENTION

The present invention provides a grease filter having opposed upper and lower baffle assemblies which define tortuous paths for exhaust air flowing therethrough. The lower baffle assembly includes an array of elongate, metal, laterally-spaced, upwardly-opening, gutter-shaped baffles, and the upper baffle assembly includes an array of elongate, metal, laterally-spaced, downwardly-opening, gutter-shaped baffles. The baffles of the upper and lower baffle assemblies are offset relative to each other to define the tortuous paths and to eliminate any straight line paths therethrough. An elongate perforated metal strip extends within each of the downwardly-opening, gutter-shaped baffles of the upper baffle assembly to maximize grease extraction from the exhaust air.

Preferably, each baffle of the upper baffle assembly has an elongate base wall with opposite downward-extending sidewalls that define the downward-opening gutter shape of the baffle. The elongate perforated metal strip is spaced from the base wall, extends substantially parallel to the base wall, and is connected to the opposite sidewalls of the baffle. Preferably, the perforated metal strips connect to the sidewalls of the baffles via welds which space the lateral edges of the strips from the sidewalls permitting air flow around the lateral edges of the strips along the sidewalls. Further, preferably each of the sidewalls of the baffles of the upper baffle assembly extends to a free end opposite the base wall, and the free end is bent inward forming a bent edge to further increase turbulence of air flow and grease extraction.

In addition, preferably a hinge connects the upper and lower baffle assemblies together and permits the assemblies to pivot relative to one another from a closed operative position to an open position which enables ready access to all surfaces of the assemblies for cleaning purposes. The filter also includes a locking mechanism for securing the baffle assemblies in the closed position.

According to another aspect of the present invention, a kitchen ventilating system is provided. The system includes food preparation apparatus selected from a group consisting of a grill, a broiler, a range and a stove, and a canopy located above the apparatus for exhausting air rising upwardly from the apparatus and laden with grease and/or oil vapors. A grease filter, as discussed above, is mounted within a mouth of the canopy and is removable therefrom for cleaning.

BRIEF DESCRIPTION OF THE DRAWINGS

The features and advantages of the present invention should become apparent from the following description when taken in conjunction with the accompanying drawings, in which:

FIG. 2 is a cross-sectional view of the grease filter along line 2-2 of FIG. 1;

FIG. 3 is an enlarged, discontinuous cross-sectional view of the grease filter along line 3-3 of FIG. 2;

DETAILED DESCRIPTION OF THE INVENTION

Figure 1:
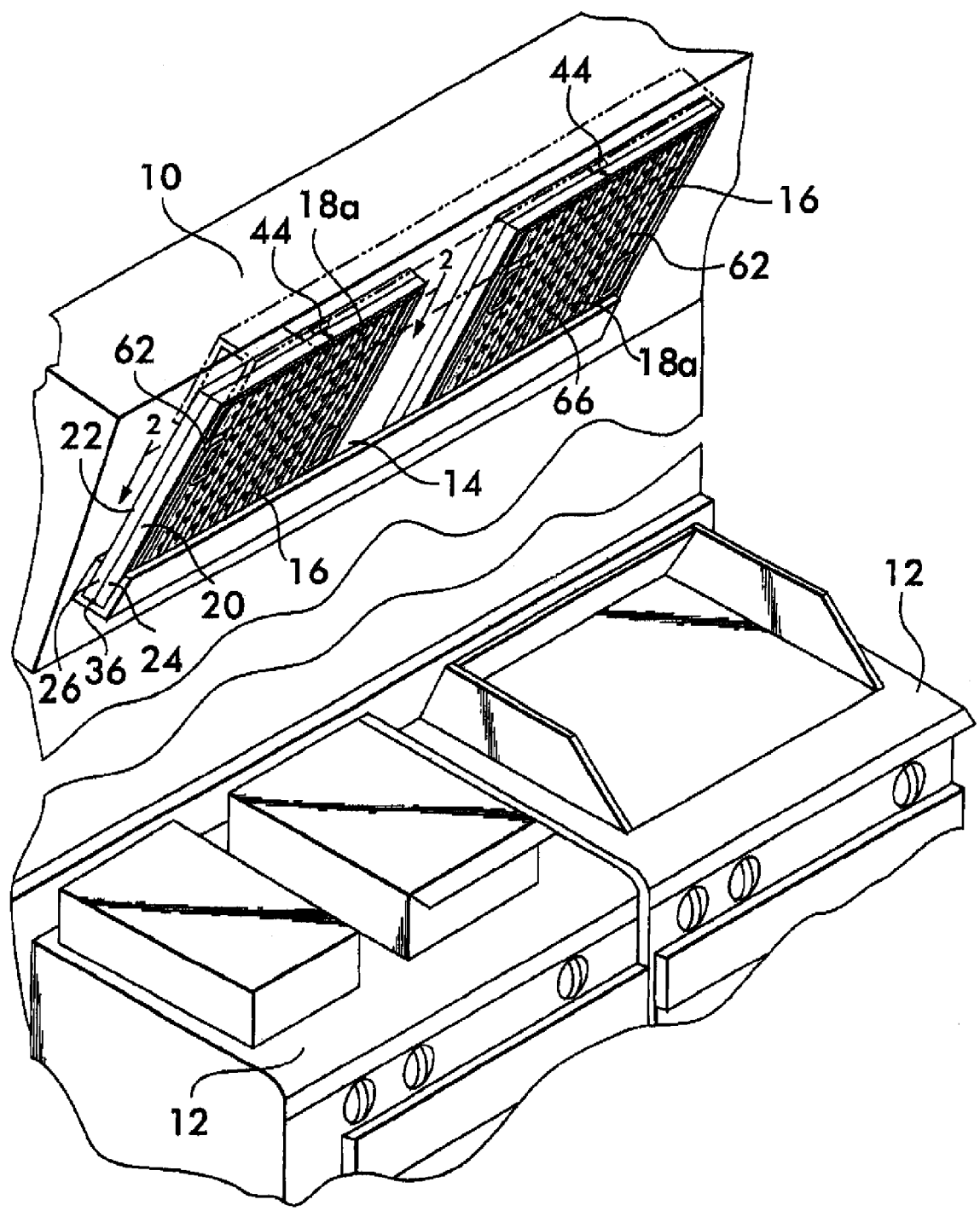
FIG. 1 is a perspective view of a grill and exhaust system utilizing the grease filter according of the present invention.

The present invention relates to a system for exhausting grease and/or oil laden hot air from a kitchen or like area. An example of such a setup is illustrated in FIG. 1 in which a canopy 10 extends above food preparation apparatus 12 for receiving grease laden air rising therefrom. The apparatus 12 can include, for instance, a grill, stove, broiler, range or the like, and the canopy 10 typically has a mouth 14 providing an exhaust path for air to exit the building. Fans (not shown) or the like can be located upstream of the mouth 14 in the ventilation system to pull air through the mouth 14.

One or more grease filters 16 can be located in the mouth 14 of the canopy 10. Each grease filter 16 provides tortuous paths "P" (see arrows in FIG. 2) for air laden with grease, oil and like contaminants so that the contaminants adhere to the surfaces of the grease filter 16 and are thereby removed from the air before being vented. The grease filters 16 are typically positioned on a angle or in a slanted position (for instance, see FIG. 1) within the mouth 14 of the canopy 10 so that, when grease or like substance accumulates within any of the plurality of gutter-shaped elongate baffles 18a (see FIG. 5) of the grease filter 16, the grease slides down the baffles 18a and is directed via drainage apertures 64 (see FIG. 5) to a holding reservoir (not shown) adjacent the bottom of the mouth 14 of the canopy 10.

The grease filter 16 has a lower baffle assembly 20 including a peripheral frame 24 which supports an array of elongate, laterally-spaced, upwardly-opening, gutter-shaped baffles 18a extending across a central opening thereof. The grease filter 16 also includes an upper baffle assembly 22 opposed to the lower baffle assembly 20. The upper baffle assembly 22 includes a peripheral frame 26 which supports an array of elongate, laterally-spaced, downwardly-opening, gutter-shaped baffles 18b extending across a central opening thereof. The opposed elongate baffles 18a and 18b extend in substantially the same direction and are of substantially the same size. However, the baffles 18a and 18b are offset relative to one another such that there is no direct or straight line path for grease laden air to pass through the grease filter without impinging upon one or more grease droplet collecting surfaces of the baffles 18a and 18b (see FIG. 2).

Accordingly, when the grease filter 16 is in a closed position as shown in FIG. 2, the grease filter 16 defines the series of tortuous paths "P" through which grease laden air must pass before being vented. The air enters via the front 66 of the filter 16 best shown in FIG. 5. The grease laden air passes into the filter 16 via spacing provided between the array of baffles 18a of the lower baffle assembly 20 as best shown in FIG. 2. Upon entering the grease filter 16, the rising grease laden air impinges upon the upper baffles 18b and is deflected downwardly by the walls of the downwardly-opening, gutter-shaped upper baffles 18b into the upwardly-opening gutter-shaped baffles 18a. From this point, the air then rises or is drawn upwardly between the spacing provided between each pair of adjacent baffles 18b and out of the filter 16. To create these paths "P", the baffles, 18a and 18b, in each assembly, 20 and 22, are laterally spaced-apart providing openings or gaps therebetween, and the baffles, 18a and 18b, in the opposed assembly, 20 and 22, are staggered or offset relative to one another covering the openings or gaps of the opposed assembly, 20 and 22, to eliminate any direct straight line paths for grease laden air to pass through the grease filter 16 without impinging upon at least one, if not multiple, baffle surface.

Typically, grease droplets carried in the air adhere to surfaces 28 of baffles 18b and drip onto the surfaces 30 of baffles 18a, or adhere directly to the surfaces 30. The upwardly-opening baffles 18a function as channels, gutters, or chutes and direct the accumulation of grease under the force of gravity to an end wall 32 of the grease filter 16 to any of a series of drainage apertures 64 provided in the peripheral frame 24. The grease flows through the drainage apertures 64 on its way to the holding reservoir (not shown).

The present invention as thus disclosed is similar in many aspects to that disclosed in co-pending U.S. patent application Ser. No. 11/226,140 (published as U.S. Patent Application Publication No. 2007/0056578 A1), the disclosure of which is incorporated herein by reference. However, the grease filter 16 of the present invention includes several improvements enabling a greater amount of grease to be extracted from the air passing through the grease filter 16.

Figure 5:
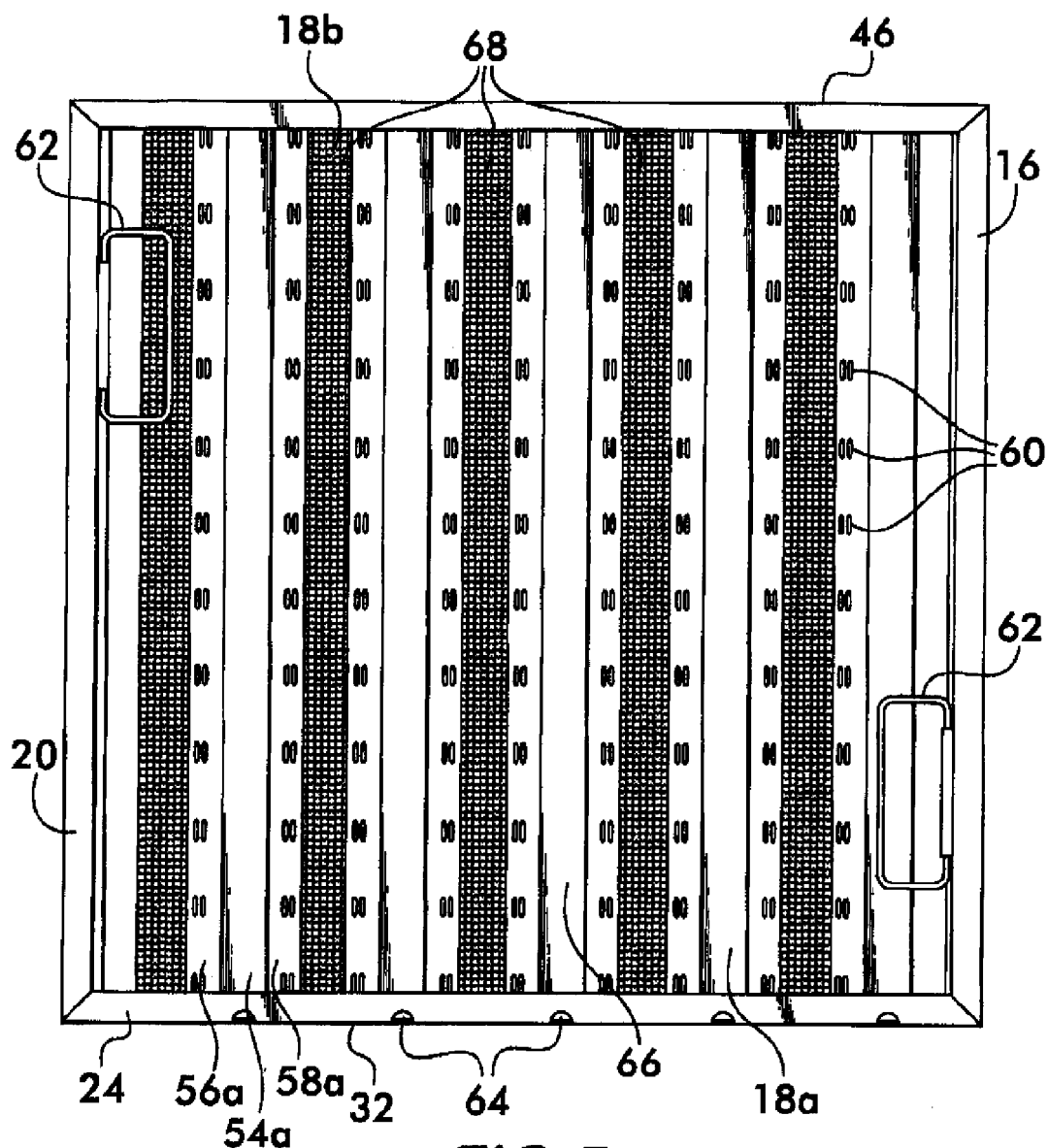
FIG. 5 is a front plan view of the grease filter according to the present invention.

As best illustrated in FIGS. 2 and 5, a perforated elongate strip 68 is secured in the mouth of each baffle 18b of the upper assembly 22. For example, each baffle 18b has an elongate base wall 54b with opposite downwardly-extending sidewalls 56b and 58b that together define a downwardly-opening channel, or gutter, which extends from end wall 46 to opposite end wall 32 of the grease filter 16. The perforated strip 68 extends substantially the full length of the baffle 18b and interconnects to the sidewalls 56b and 58b a spaced distance from base wall 54b and is substantially parallel to the base wall 54b. In use, the strips 68 generate turbulence in the air flow and provide additional surfaces to which grease droplets adhere. In addition, the strips 68 include perforations 70 through which air must flow to impinge on base wall 54b and then must flow again before being directed into the mouth of the upwardly-opening baffles 18a. The end result is that the perforated strips 68 enable extraction of a greater percentage of grease from the grease laden air.

The free ends 72 of the sidewalls 56b and 58b of the upper baffles 18b include inwardly bent edges 74. The bent edges 74 generate additional turbulence and provide additional surfaces exposed generally perpendicular to air flow. The presence of the bent edges 74 enables the extraction of a greater percentage of grease from the grease laden air by the filter 16.

As best illustrated in FIG. 2, the baffles 18a of the lower baffle assembly 20 also include base walls 54a and opposite sidewalls 56a and 58a. Preferably, each sidewall, 56a and 58a, defines an array of apertures 60. See FIG. 5. The apertures 60 reduce static pressure and increase the turbulence of air traveling through the grease filter 16 thereby further increasing the ability of the grease filter 16 to remove grease and like contaminants from the air flow. As best illustrated in FIG. 5, the array of apertures 60 include pairs of apertures uniformly spaced apart along the length of the baffles. This ensures uniform air flow throughout the length of the baffles 18a.

Figure 4:
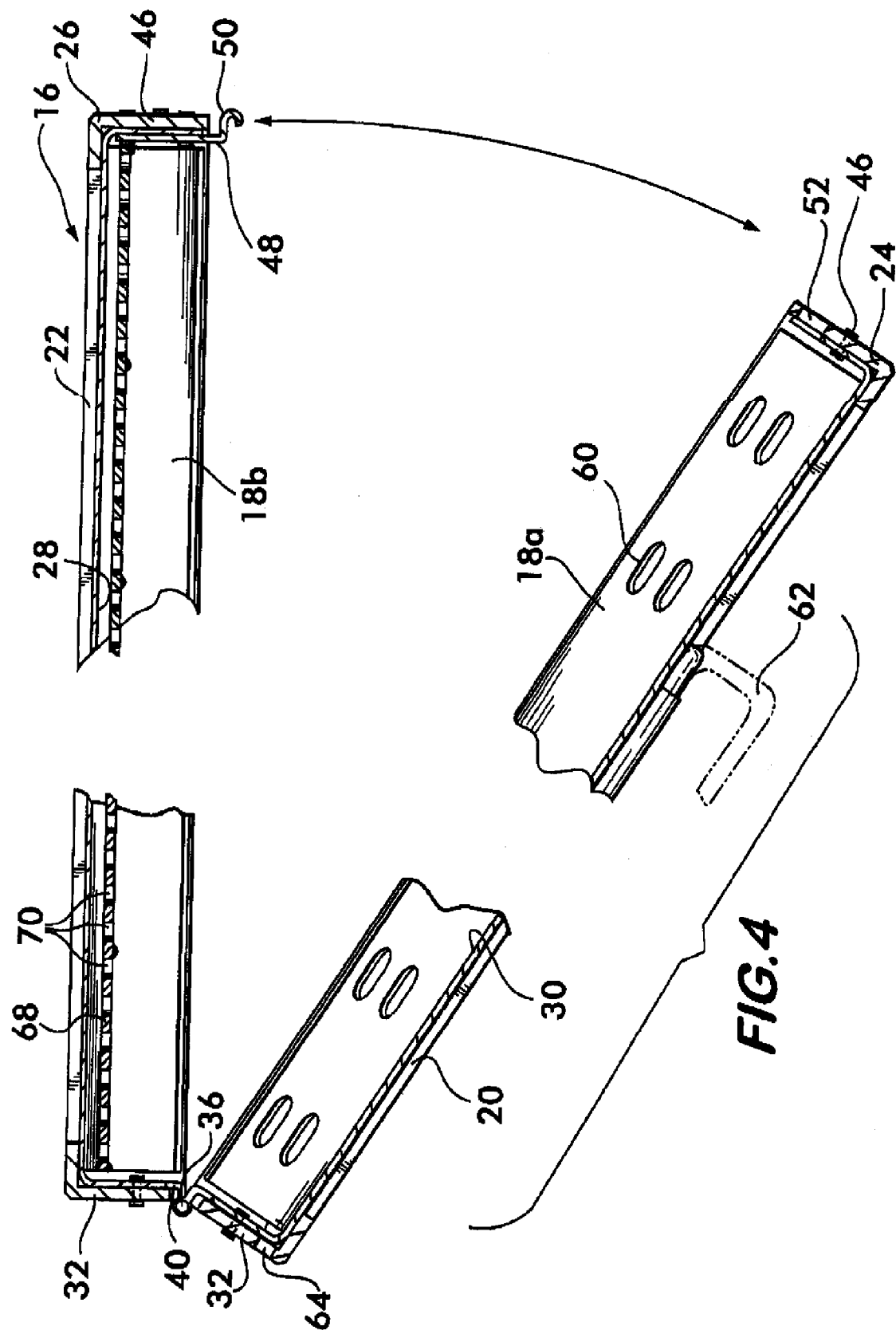
FIG. 4 is a discontinuous cross-sectional view of the grease filter in a partially open position according to the present invention.

Periodically, the grease filter 16 requires cleaning. Thus, the grease filter 16 is removable from the canopy 10 and is able to be cleaned in an efficient manner before being re-installed in the canopy 10. For this purpose, the frames, 24 and 26, of the lower and upper baffle assemblies, 20 and 22, are connected by hinges 36 extending adjacent and rearward of the end wall 32. As best illustrated in FIG. 4, the hinges 36 permit the lower and upper assemblies, 20 and 22, to pivot from the closed position illustrated in FIG. 2 to an open position illustrated in FIG. 4. Preferably, the hinges 36 permit the assemblies 20 and 22 to pivot 180° about hinges 36 so that all surfaces are exposed for efficient and effective cleaning, including surfaces 28 and 30 of the baffles.

As best illustrated in FIGS. 3 and 4, the grease filter 16 includes a locking mechanism 44 for use in securing the assemblies, 20 and 22, in the closed position. The locking mechanism 44 is located on an end wall 46 of the frames, 24 and 26, opposite from the end wall 32 on which the hinges 36 and drainage apertures 64 are provided. This particular location of the locking mechanism 44 permits it to remain relatively clean and prevents it is from becoming contaminated with grease or the like to ensure that the locking mechanism 44 remains in a useful condition for long term and repeated use.

The illustrated embodiment of the locking mechanism 44 is provided as a resilient locking tab 48 extending from the end wall 46 of the peripheral frame 22 and having an outwardly projecting curved end 50. The end 50 can be captured in a locking opening 52 formed in the end wall 46 of the peripheral frame 20. Thus, in the closed position, the curved end 50 is captured in opening 52 preventing relative movement between assemblies, 20 and 22. See FIG. 3. However, pressure can be applied to the curved end 50 to deflect it inwardly so that the assemblies, 20 and 22, can be pulled apart and pivoted about hinges 36. Since the tab 48 is resilient, it automatically snaps into the opening 52 when the assemblies, 20 and 22, are pivoted into the closed position.

By way of example, the grease filter 16 including the peripheral frames, 24 and 26, baffles 18a and 18b, and perforated strips 68 can be made of stainless steel, galvanized steel, aluminum or a like material. The grease filter 16 can be rectangular with dimensions in a closed position of about one to three feet by about one to three feet by about several inches. Of course, the grease filter can be made to any dimensions, as desired. Preferably, a pair of handles 62 are pivotally connected to the peripheral frame 24 of the lower baffle assembly 20 enabling ready handling of the grease filters 16 during installation and removal relative to the canopy 10.

In one contemplated embodiment, the metal perforated strips 68 are welded to the sidewalls 56b and 58b of the baffles 18b and the welds space the edges of the strips 68 approximately 0.125 inch from each sidewall 56b and 58b permitting air flow around the edges of the perforated strip 68 closely adjacent the sidewalls 56b and 58b. The perforations 70, for example, can be circular and have a diameter of about 0.125 inch. Preferably the sidewalls 56b and 58b extend at an angle of about 45° from the base wall 54b and at an angle of about 90° relative to each other. In addition, preferably each bent edge 74 forms about 0.125 inch of the free end 72 of the sidewalls 56b and 58b and extends at an angle of about 65° relative to the remaining portion of the sidewall, 56b and 58b. Finally, preferably the peripheral frames 24 and 26 each consist of a single frame to which the baffles, 18a and 18b, are directly welded. This minimizes scrap produced during manufacture of the filters 16.

In use, the present invention enables efficient and effective cleaning of a grease filter of a kitchen ventilating system. The grease filter 16 is removed from the mouth 14 of the canopy 10 which is located above food preparation apparatus 12. The upper and lower baffle assemblies 20 and 22 of the grease filter 16, in a closed position, define tortuous paths "P" for exhausting air therethrough. The filter 16 also has hinges 36 connecting the upper and lower baffle assemblies, 20 and 22.

The locking mechanism 44 that is located on a peripheral side of the assemblies, 20 and 22, opposite the hinge 36 secures the assemblies, 20 and 22, in the closed position. The process of cleaning the filter includes unlocking the mechanism 44 and pivoting the upper and lower baffle assemblies, 20 and 22, relative to each other about the hinges 36. This places the assemblies, 20 and 22, in an open position and permits all surfaces of the grease filter 16 to be exposed for cleaning.

As discussed above, preferably the locking mechanism 44 of the grease filter 16 of the present invention includes a resilient locking tab 48 extending from the outer peripheral frame, 24 or 26, of one of the upper and lower baffle assemblies, 20 and 22, and a locking tab opening 52 in the outer peripheral frame, 24 or 26, of the other baffle assembly, 20 and 22. The step of unlocking the assemblies can include pressing the locking tab 48 inwardly to release the tab 48 from the tab opening 52 and simultaneously pulling the assemblies, 20 and 22, apart so that the assemblies, 20 and 22, pivot about the hinges 36.

The grease filter 16 can be manually cleaned with soap and a brush or can be cleaned in an automatic dishwasher or pot sink. After the grease filter 16 is cleaned, the assemblies, 20 and 22, can be pivoted into a closed position. The resilient nature of the locking tab 48 causes it to be automatically seated and captured within the locking tab opening 52. Thereafter, the grease filter 16 is installed within the mouth 14 of the canopy 10.

While preferred exhaust systems, grease filter devices, and cleaning processes have been described in detail, various modifications, alterations, and changes may be made without departing from the spirit and scope of the system, device and process according to the present invention as defined in the appended claims.

The invention claimed is:

1. A grease filter, comprising:
   a lower baffle assembly including an array of elongate, metal, laterally-spaced, upwardly-opening, gutter-shaped baffles;
   an upper baffle assembly opposed to said lower baffle assembly, said upper baffle assembly including an array of elongate, metal, laterally-spaced, downwardly-opening, gutter-shaped baffles; and
   an elongate perforated metal strip extending within each of said downwardly-opening, gutter-shaped baffles of said upper baffle assembly;
   said baffles in said lower and upper assemblies being offset relative to each other to define tortuous paths for exhaust air passing through the filter and to eliminate any straight line paths through said lower and upper baffle assemblies;
   each of said baffles of said lower baffle assembly having an elongate base wall with opposite upwardly extending sidewalls defining a channel; and
   said sidewalls of said baffles in said lower baffle assembly having a plurality of apertures.

2. A grease filter according to claim 1, wherein each baffle of said upper baffle assembly has an elongate base wall with opposite downwardly extending sidewalls defining said downwardly-opening gutter shape of said baffle, and wherein said elongate perforated metal strip within said baffle is spaced from said base wall and extends substantially parallel to said base wall and is secured to said opposite sidewalls of said baffle.

3. A grease filter according to claim 2, wherein said perforated metal strips within said baffles of said upper baffle assembly connect to said sidewalls of said baffles via welds, and wherein said welds space lateral edges of said strips from said sidewalls permitting air flow around said lateral edges of said strips along said sidewalls.

4. A grease filter according to claim 3, wherein each of said sidewalls of said baffles of said upper baffle assembly extends to a free end opposite said base wall, and wherein said free end is bent inward forming a bent edge.

5. A grease filter according to claim 4, wherein each sidewall extends at an angle of about 45° from said base wall, said sidewalls of each baffle extend at about a 90° angle from each other, and said bent edge of each of said sidewalls extends at an angle of about 65° relative to a remaining portion of said sidewall.

6. A grease filter according to claim 1, further comprising a hinge connecting said upper and lower baffle assemblies and permitting said assemblies to pivot relative to one another from a closed position in which said tortuous paths are provided to an open position enabling ready access to all surfaces of said assemblies for purposes of cleaning said assemblies.

7. A grease filter according to claim 6, further comprising a locking mechanism for securing said assemblies in said closed position, said locking mechanism being located on a peripheral side of said assemblies opposite said hinge.

8. A grease filter according to claim 7, wherein each of said upper and lower baffle assemblies includes an outer peripheral frame defining a central opening with said arrays of spaced-apart baffles welded directly to said frames and extending across said central openings.

9. A grease filter according to claim 8, wherein said locking mechanism includes a resilient locking tab extending from said outer peripheral frame of one of said upper and lower baffle assemblies and a locking tab opening in said outer peripheral frame of the other of said upper and lower baffle assemblies, whereby, in said closed position, said assemblies are locked together when said resilient locking tab is captured within said locking tab opening.

10. A grease filter according to claim 8, wherein said outer peripheral frames are rectangular, and wherein a pair of handles are connected to said outer peripheral frame of said lower baffle assembly.

11. A grease filter according to claim 10, wherein said upper and lower baffle assemblies are made of stainless steel, galvanized steel or aluminum.

12. A kitchen ventilating system, comprising:

food preparation apparatus selected from a group consisting of a grill, a broiler, a range and a stove;

a canopy located above said apparatus for exhausting air rising upwardly from said apparatus and laden with grease or oil vapors; and at least one grease filter removably mounted within a mouth of said canopy;

said grease filter having opposed upper and lower baffle assemblies defining tortuous paths through which the exhaust must pass;

said lower baffle assembly having an array of elongate, metal, laterally-spaced, upwardly-opening, gutter-shaped baffles, and said upper baffle assembly having an array of elongate, metal, laterally-spaced, downwardly-opening, gutter-shaped baffles;

said baffles in said lower and upper baffle assemblies being offset relative to each other to define said tortuous paths and to eliminate any straight line paths for exhaust air through said lower and upper baffle assemblies;

each baffle in said upper baffle assembly supporting an elongate perforated metal strip extending therein;

each baffle of said lower baffle assembly having an elongate base wall with opposite upwardly extending sidewalls defining a channel; and said sidewalls of said baffles in said lower baffle assembly having a plurality of apertures.

13. A kitchen ventilating system according to claim 12, wherein each baffle of said upper baffle assembly has an elongate base wall with opposite downwardly extending sidewalls defining said downwardly-opening gutter shape of said baffle, and wherein said elongate perforated metal strip within said baffle is spaced from said base wall and extends substantially parallel to said base wall and is secured to said opposite sidewalls of said baffle.

14. A kitchen ventilating system according to claim 13, wherein said perforated metal strips within said baffles of said upper baffle assembly connect to said sidewalls of said baffles via welds, and wherein said welds space lateral edges of said strips from said sidewalls permitting air flow around said lateral edges of said strips along said sidewalls.

15. A kitchen ventilating system according to claim 13, wherein each of said sidewalls of said baffles of said upper baffle assembly extends to a free end opposite said base wall, and wherein said free end is bent inward forming a bent edge.

16. A kitchen ventilating system according to claim 12, further comprising a hinge connecting said upper and lower baffle assemblies and permitting said assemblies to pivot relative to one another from a closed position in which said tortuous paths are provided to an open position enabling ready access to all surfaces of said assemblies for purposes of cleaning said assemblies.

17. A kitchen ventilating system according to claim 16, further comprising a locking mechanism for securing said assemblies in said closed position, said locking mechanism being located on a peripheral side of said assemblies opposite said hinge.

18. A kitchen ventilating system according to claim 17, wherein a pair of handles are connected to said lower baffle assembly, and wherein said upper and lower baffle assemblies are made of stainless steel, galvanized steel or aluminum.

* * * * *